US008620535B2

(12) United States Patent
Friend et al.

(10) Patent No.: US 8,620,535 B2
(45) Date of Patent: Dec. 31, 2013

(54) SYSTEM FOR AUTOMATED EXCAVATION PLANNING AND CONTROL

(75) Inventors: Paul Russell Friend, Morton, IL (US); Thandava Krishna Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/476,446

(22) Filed: May 21, 2012

(65) Prior Publication Data

US 2013/0311031 A1 Nov. 21, 2013

(51) Int. Cl.
*E02F 3/84* (2006.01)

(52) U.S. Cl.
USPC ............ 701/50; 701/23; 701/26; 172/1

(58) Field of Classification Search
USPC ............... 701/26, 23, 50, 36; 172/1
See application file for complete search history.

(56) References Cited

U.S. PATENT DOCUMENTS

| | | | |
|---|---|---|---|
| 5,375,663 A | | 12/1994 | Teach |
| 5,646,844 A * | | 7/1997 | Gudat et al. ............ 701/409 |
| 5,924,493 A | | 7/1999 | Hartman et al. |
| 5,964,298 A * | | 10/1999 | Greenspun ............ 172/4.5 |
| 6,076,030 A * | | 6/2000 | Rowe ................ 701/50 |
| 6,085,583 A | | 7/2000 | Cannon et al. |
| 6,088,644 A * | | 7/2000 | Brandt et al. ........... 701/50 |
| 6,108,949 A | | 8/2000 | Singh et al. |
| 6,363,632 B1 * | | 4/2002 | Stentz et al. ............. 37/414 |
| 6,845,311 B1 * | | 1/2005 | Stratton et al. .......... 701/50 |
| 7,516,563 B2 * | | 4/2009 | Koch ................ 37/348 |
| 7,734,398 B2 * | | 6/2010 | Manneppalli ............ 701/50 |
| 8,083,004 B2 * | | 12/2011 | Knight, Jr. ............. 172/7 |
| 8,156,048 B2 * | | 4/2012 | Mintah et al. ............ 705/50 |
| 8,229,631 B2 * | | 7/2012 | Morey et al. ............ 701/50 |
| 2012/0136508 A1 * | | 5/2012 | Taylor et al. ............. 701/2 |
| 2013/0006484 A1 * | | 1/2013 | Avitzur et al. ........... 701/50 |

FOREIGN PATENT DOCUMENTS

WO WO 2011104703 A1 * 9/2011

* cited by examiner

*Primary Examiner* — Helal A Algahaim
*Assistant Examiner* — Genna Mott
(74) *Attorney, Agent, or Firm* — Finnegan, Henderson, Farabow, Garrett & Dunner LLP

(57) ABSTRACT

A control system is disclosed for a mobile excavation machine operating at a worksite. The control system may have a locating device mounted on the mobile excavation machine that is configured to generate a signal indicative of a current position of the mobile excavation machine at the worksite during completion of an excavation plan. The control system may also have a controller in communication with the locating device and the mobile excavation machine. The controller may be configured to autonomously control the mobile excavation machine based on the excavation plan, and to determine a volume of material missed during completion of a first cut of the excavation plan based on the signal. The controller may be further configured to adjust a characteristic of a second cut of the excavation plan based on the volume of material missed during completion of the first cut of the excavation plan.

20 Claims, 3 Drawing Sheets

SYSTEM FOR AUTOMATED EXCAVATION PLANNING AND CONTROL

TECHNICAL FIELD

The present disclosure relates generally to a control system and, more particularly, to a system for automatically planning excavation at a worksite and responsively controlling a machine to complete the excavation.

BACKGROUND

Machines such as dozers, motor graders, wheel loaders, and other types of heavy equipment are used to perform a variety of tasks. Some of these tasks require very precise and accurate control over operation of the machine that are difficult for an operator to provide. Other tasks requiring removal of large amounts of material can be difficult for an unskilled operator to achieve efficiently. Because of these factors, the completion of some tasks by a completely operator-controlled machine can be expensive, labor intensive, time consuming, and inefficient.

One method of improving the operation of a machine under such conditions is described in U.S. Pat. No. 5,375,663 (the '663 patent) issued to Teach on Dec. 27, 1994. The '663 patent describes an earthmoving apparatus and method for grading a tract of land to a desired finish contour. The earthmoving apparatus has a blade of known width for cutting and filling soil. Vertical blade movement and the x and y position of the earthmoving apparatus are continually detected by sensors as the earthmoving apparatus traverses the tract of land. An ultrasonic transmitter and receiver detects elevation of the soil to provide updated soil elevation information. A computer uses this information to generate a contour map of the tract of land with fill and cut lines thereon that will produce the desired finish contour. The computer continuously modifies the contour map to reflect changes in the topography of the tract of land as the earthmoving apparatus proceeds with the grading process. In addition, the computer generates an elevation error based on the contour map and a detected position of the blade. The computer then automatically adjusts elevation of the blade to reduce the elevation error.

Although the computer of the '663 patent may help control an earthmoving apparatus during final grading, it may be less than optimal during bulk material operations that require multiple passes to remove a desired amount of material in a particular manner. In addition, although the computer of the '663 patent may be able to adjust a position of the blade in real-time to match a current excavation goal, the computer may not be capable of adjusting future excavation goals based on current performance.

The disclosed system is directed to overcoming one or more of the problems set forth above.

SUMMARY

In one aspect, the present disclosure is directed to a control system for a mobile excavation machine operating at a worksite. The control system may include a locating device mounted on the mobile excavation machine that is configured to generate a signal indicative of a current position of the mobile excavation machine at the worksite during completion of an excavation plan. The control system may also include a controller in communication with the locating device and the mobile excavation machine. The controller may be configured to autonomously control the mobile excavation machine based on the excavation plan, and determine a volume of material missed during completion of a first cut of the excavation plan based on the signal. The controller may be further configured to adjust a characteristic of a second cut of the excavation plan based on the volume of material missed during completion of the first cut of the excavation plan.

In yet another aspect, the present disclosure is directed to a method of excavation planning and control. The method may include autonomously controlling a mobile excavation machine to complete an excavation plan, and determining a volume of material missed during completion of a first cut of the excavation plan. The method may further include adjusting a characteristic of a second cut of the excavation plan based on the volume of material missed during completion of the first cut of the excavation plan.

DETAILED DESCRIPTION

Figure 1:
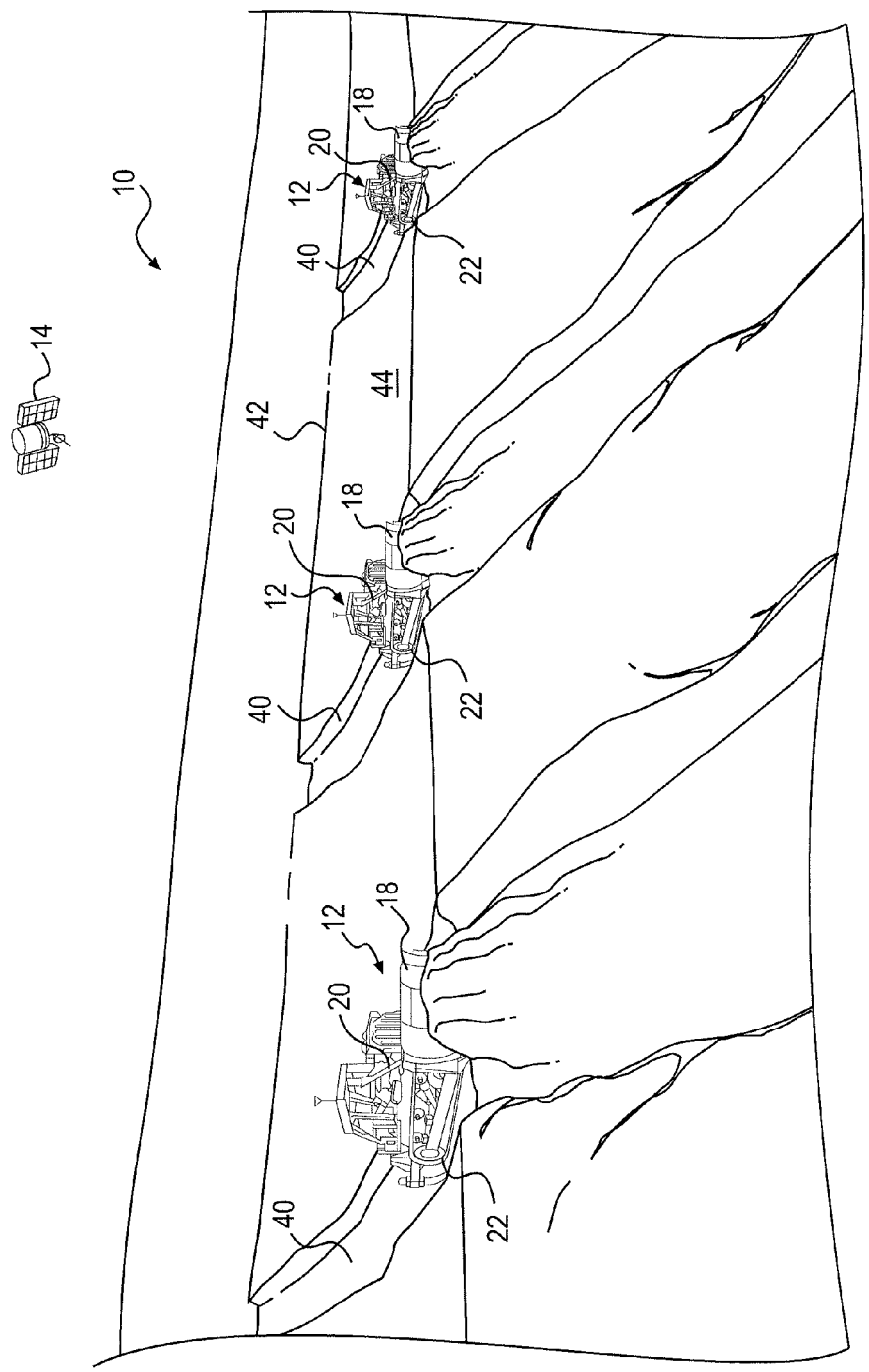
FIG. 1 is a pictorial illustration of an exemplary disclosed worksite.

FIG. 1 illustrates a worksite 10 with one or more exemplary machines 12 performing a predetermined task. Worksite 10 may include, for example, a mine site, a landfill, a quarry, a construction site, or any other type of worksite known in the art. The predetermined task may be associated with altering the current geography at worksite 10. For example, the predetermined tasks may include a dozing operation, a grading operation, a leveling operation, a bulk material removal operation, or another type of operation that results in alteration of the current geography at worksite 10. As machine 12 moves about worksite 10, one or more satellites 14 or other tracking devices may communicate with a control system 16 (shown in FIG. 2) to monitor the movements of machine 12.

Machine 12 may embody a mobile machine that performs some type of operation associated with an industry such as mining, construction, farming, or any other industry known in the art. For example, machine 12 may embody an earth moving machine such as a dozer (shown in FIG. 1) having a blade or other work tool 18 movable by way of one or more motors or actuators 20. Machine 12 may also include one more traction devices 22 that function to steer and/or propel machine 12.

Figure 2:
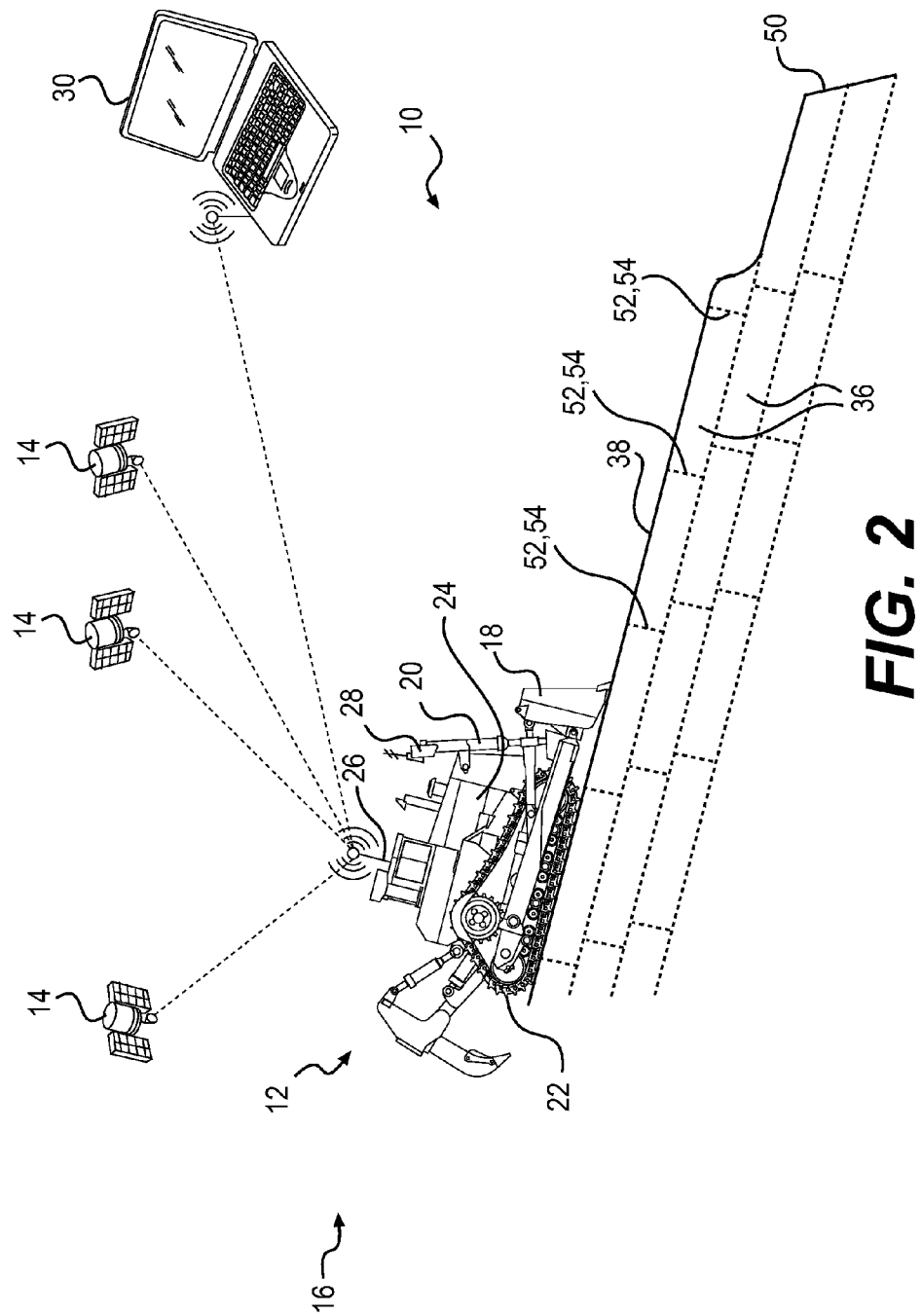
FIG. 2 is a pictorial illustration of an exemplary disclosed control system that may be used at the worksite of FIG. 1.

As illustrated in FIG. 2, control system 16 may include components that interact to affect operation of machine 12 in response to positional information received from satellites 14. In particular, control system 16 may include a power source 24 used to power actuators 20 and traction device 22, a locating device 26, a tool position sensor 28, and a controller 30. Controller 30 may include onboard and/or offboard components in communication with power source 24, actuators 20, traction device 22, locating device 26, and position sensor 28 via multiple different communication links (not shown) to autonomously control operations of machine 12.

Power source 24 may include an engine such as, for example, a diesel engine, a gasoline engine, a gaseous fuel-powered engine such as a natural gas engine, or any other type of engine apparent to one skilled in the art. Power source 24 may alternatively include a non-combustion source of power such as a fuel cell, a power storage device, an electric motor, or other similar mechanism. Power source 24 may be connected to traction devices 22 and/or actuators 20 via a direct mechanical coupling, an electric circuit, a hydraulic circuit, or in any other suitable manner.

Locating device 26 may embody an electronic receiver configured to communicate with satellites 14 to determine a relative location and/or orientation of itself. In particular, locating device 26 may receive and analyze high-frequency, low-power radio signals from multiple satellites 14 to triangulate a 3-D position of itself relative to the different satellites 14. Alternatively, locating device 26 may embody an Inertial Measurement Unit (IMU), a component of a local tracking system, or any other known locating device that receives or determines positional information associated with machine 12. Signals indicative of this position may then be communicated from locating device 26 to controller 30. It should be noted that this position signal may also include information regarding the orientation (e.g., attitude, pitch, inclination, etc.) of machine 12, if desired.

Position sensor 28 may embody any type of sensor configured to detect a position of a work tool 18 relative to a known position on machine 12 (e.g., relative to the known position of locating device 26), and generate a corresponding signal. In one example, position sensor 28 may be an acoustic, magnetic, or optical type sensor associated with actuators 20 and/or linkages that move work tool 18. In another example, position sensor 28 may be a local and/or global positioning sensor configured to communicate with offboard devices (e.g., local laser systems, radar systems, satellites 14, etc.) to directly determine local and/or global coordinates of work tool 18. It should be noted that any number and type of position sensors 28 may be included and positioned at any location on or near work tool 18. Based on signals generated by position sensor(s) 28 and based on known characteristics (e.g., height, width, weight, etc.) and kinematics (range of available motion) of machine 12 and work tool 18, controller 30 may be configured to determine in real-time a location of the associated work tool 18 relative to the known position of machine 12.

Controller 30 may include means for monitoring, recording, storing, indexing, processing, and/or communicating the location of machine 12 and position of work tool 18 during generation of an excavation plan, and for automatically controlling operations of machine 12 based on the excavation plan. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 30 may further include a means for communicating with offboard systems (not shown), if desired. For example, controller 30 may include hardware and/or software that enables sending and receiving of data messages through a direct data link (not shown) or a wireless communication link (not shown). The wireless communications may include satellite, cellular, infrared, and any other type of wireless communications that enable controller 30 to exchange information. It is contemplated that a separate module may alternatively be included within control system 16 to facilitate the communication of data between controller 30 and the offboard system, if desired.

The offboard system, if present, may represent one or more receiving, computing, and/or display systems of a business entity associated with machine 12, such as a manufacturer, dealer, retailer, owner, service provider, or any other entity that generates, maintains, sends, and/or receives information associated with machine 12. The one or more computing systems may include, for example, a machine simulator, a mainframe, a work station, a laptop, a personal digital assistant, and other computing systems known in the art.

As described above, controller 30, based on various user input and location information from locating device 26 and position sensor 28, may be configured to perform methods of excavation planning and control for machine 12. The excavation planning method may include, among other things, determining a location, size, and shape of a plurality of cuts 36 into an intended work surface 38 at worksite 10; grouping cuts 36 into a plurality of spaced apart locations known as slots 40 (referring to FIG. 1), including determining a spacing between, a size of, and a trajectory of slots 40; determining a sequence of particular cuts 36 that should be excavated in order; determining a number of passes through each sequence required to accomplish an excavation phase; and determining a number of phases required to complete the excavation plan. The user input may include, for example, characteristics of an available and intended excavation area 44 at worksite 10 (referring to FIG. 1), such as current boundaries 42, and a site profile (i.e., initial contour, slope, coordinates, etc.). The user input may also include desired goal(s) regarding excavation of area 44 such as an amount of material to be moved and/or a final contour of area 44.

Based on the characteristics of the available excavation area 44 at worksite 10 and the desired goal(s) received from the user of control system 16, controller 30 may be configured to divide area 44 into a number of spaced apart slots 40, each slot containing multiple cuts 36. The dimensions of slots 40 (e.g., width, depth, etc.) may be determined by controller 30 based on machine characteristics (e.g., work tool width), user-defined spacing between slots, and machine output or capacity (e.g., rated torque and/or speed). It is contemplated that the dimensions of slots 40 may also or alternatively be determined by controller 30 based on site conditions such as material composition, grade, etc. Controller 30 may utilize a simple coverage algorithm to lay out slots 40 on work area 44, with ends of slots 40 terminating at boundary 42 and slots 40 having a fixed spacing therebetween. The layout of slots on work area 44 by controller 30 may also be affected by a desired dozing behavior of machines 12 that is selected by the user of control system 16, if desired.

After laying out slots 40 on area 44 of worksite 10, controller 30 may be configured to design cuts 36 within slots 40. The number, shape, size, and location of cuts 36 may be determined based on the slot layout, site characteristics, machine characteristics, desired dozing behavior, and user-defined goals. The site characteristics considered by controller 30 may include, among other things, a contour of surface 38 and a composition of material to be excavated from each slot 40. The machine characteristics considered by controller 30 may include, among other things, a torque and/or speed rating of machines 12 and a size of work tool 18 (e.g., a width and/or height). The user-defined goals considered by controller 30 may include, among other things, a desired final depth of slot 40 and/or a resulting contour of area 44. Based on this information and utilizing one or more algorithms and/or maps stored in memory, controller 30 may be configured to determine a number, size, and location of each individual cut 36 within slots 40 such that a sufficient amount of material may be removed by machines 12 during each pass and phase to achieve the user-defined depth and/or contour goals without negatively affecting productivity or efficiency of machine 12.

Cuts 36 may be generally arranged length-wise and end-to-end relative to each other within slots 40, and each include a start location 52 at which work tool 18 should penetrate work surface 38, an end location 54 at which work tool 18 should be extracted from work surface 38, a depth below work surface 38, and a cutting profile that are defined by controller 30. In one embodiment, the start location 52 of one cut 36 may coincide with the end location 54 of an adjacent cut 36. In another embodiment, a space (not shown) may exist between cuts 36, if desired. In general, a lengthwise slope of cuts 36 should decline as steeply as possible in a push direction while still allowing machine 12 to reverse up a subsequently excavated area in a desired gear, for example in second gear. In the disclosed embodiment, an end cut 36 of each slot 40 should terminate at a push edge 50, such that as machine 12 reaches the end of slot 40, the material being pushed by machine 12 may tumble out of slot 40 and down a face of push edge 50. In the disclosed embodiment of FIG. 2, cuts 36 are arranged into three passes (i.e., three layers), each pass having about the same depth. In addition, each cut 36 may have about the same length, and have start and end locations 52, 54 that are generally coincident within the same pass, but staggered between passes. It is contemplated that other relationships may also be utilized.

After laying out slots 40 on area 44 of worksite 10, and determining the sizes and locations of cuts 36 within slots 40, controller 30 may be configured to display the resulting excavation plan to the user of control system 16 and receive feedback regarding the plan. The excavation plan may be presented in the form of an electronic 2-D or 3-D map displayed on a monitor within machine 12 and/or at an offboard business entity. At this point in time, the user may be able to make modifications to the excavation plan. The modifications may include, for example, a location, a length, a trajectory, a number, a spacing, a depth, and/or a profile of individual cuts 36, slots 40, and/or passes.

After receiving input from the user of control system 16 regarding modifications to the excavation plan, controller 30 may be configured to generate travel routes for machine 12 required to complete the excavation plan. The travel routes may include a machine travel path that encompasses one or more sequences of cuts 36, arrangement of the sequences into passes and phases, and corresponding tool trajectories during each of cuts 36. Controller 30 may then coordinate execution of the travel routes by machine 12.

The travel routes may be used to autonomously alter the geography of worksite 10. In particular, controller 30 of each machine 12 may autonomously control operations of machine 12 to engage work tool 18 with the terrain of worksite 10 at the recommended excavation entry and exit points. Controller 30 may be in communication with actuators 20 and/or traction devices 22 to raise, lower, and/or orient machine 12 and work tool 18 such that work tool 18 penetrates and is extracted from the terrain of worksite 10 in a desired manner. For example, controller 30 may communicate with power source 24, with various hydraulic control valves and/or electronic switches associated with actuators 20, with transmission devices, and with other actuation components of machine 12 to initiate, modify, or halt operations of actuators 20 and traction devices 22, as necessary or desired. It is contemplated that controller 30 may use locating device 26, position sensor 28, and/or other such guidance and tool positioning systems to accurately control operations of machine 12 such that work tool 18 penetrates the terrain of worksite 10 at the recommended excavation entry point or start location 52 and is extracted at the recommended exit point or end location 54. Alternatively, the travel routes for machine 12 may be displayed within an operator station of machine 12 for manual completion of the excavation process, if desired. In this manner, controller 30 may provide for partial or full autonomous control of machine 12.

During operation of machines 12 along the different travel routes, it may be possible for actual machine performance to deviate somewhat from expected machine performance. For example, it may be possible for work tool 18 to penetrate the terrain of worksite 10 at a location different from start location 52 and/or for work tool 18 to be extracted from the terrain of worksite 10 a location different from end location 54. In another example, it may be possible for the intended depth of a particular cut 36 to be too deep for a particular machine such that, when the particular machine attempts the planned cut 36, the particular machine lugs unacceptably. In yet another example, it may be possible for machine 12 to move a volume of material different than intended (i.e., more or less material). Other deviations are also contemplated.

In these situations, controller 30 may be configured to make on-the-fly adjustments to the operation of machine 12 to reduce the magnitude of the deviations. For example, when controller 30 determines that the actual movement of work tool 18 results in a distance deviation from a desired start or end location 52, 54, controller 30 may be configured to calculate and implement a tool trajectory offset that accounts for the deviation. Similarly, when controller 30 recognizes that machine 12 is lugging or about to lug unacceptably, controller 30 may be able to adjust the working depth of work tool 18 (i.e., raise work tool 18) to reduce a load on machine 12. Further, when controller 30 recognizes that too little or too much material has been moved by machine 12 during a particular cut 36, controller 30 may make adjustments as to a length and/or depth of ensuing cuts 36. Other adjustments are also considered.

Figure 3:
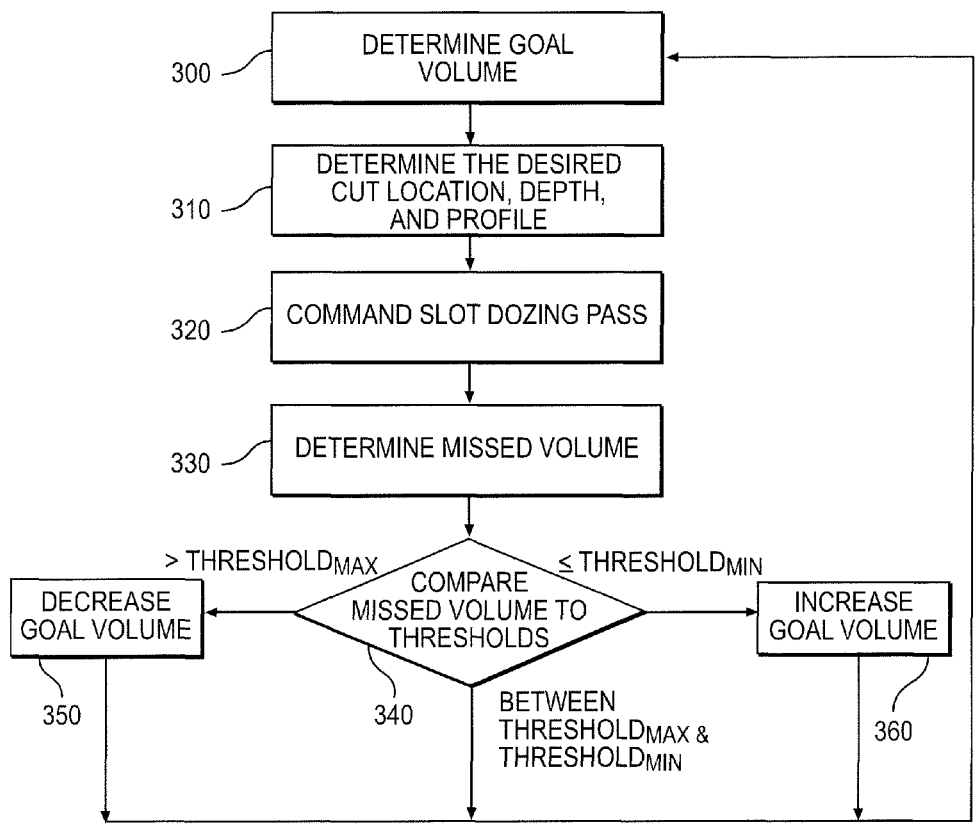
FIG. 3 is a flowchart depicting an exemplary method performed by the control system of FIG. 2.

Controller 30 may be further configured to modify the excavation plan and/or individual travel routes based on the deviations described above and/or based on the adjustments made in response to the deviations. For example, controller 30 may change the coordinates of start and/or end locations 52, 54, change a desired depth of each pass, and/or make other similar changes. In this manner, it may be more likely that machine 12 is able to follow the assigned travel route. One exemplary method utilized by controller 30 to modify the excavation plan is depicted in FIG. 3. FIG. 3 will be discussed in more detail below to further illustrate the disclosed concepts.

INDUSTRIAL APPLICABILITY

The disclosed control system may be applicable to machines performing material moving operations where productivity and efficiency are important. Although applicable to any type of machine, the disclosed control system may be particularly applicable to autonomously controlled dozing machines where the dozing machines are autonomously controlled to follow particular travel routes. The disclosed control system may determine an excavation plan for an entire worksite area, determine individual cuts, sequences of cuts, passes through each sequence, and phases of excavation required to accomplish a user-defined goal. Based on the excavation plan, the control system may then determine travel routes for individual machines operating at the worksite. The disclosed control system may also modify the excavation plan during completion of the plan such that results of the excavation process more closely match user-defined goals. Operation of control system 16 with respect to FIG. 3 will now be described in detail.

The first step in the process of FIG. 3 may include controller 30 determining a goal volume of material to be removed during each cut 36 (Step 300). The goal volume may be calculated based on, among other things, characteristics of work tool 18 (e.g., height, weight, width, range of motion, etc.), characteristics of machine 12 (e.g., torque, speed, efficiency, etc.), and characteristics of worksite 10 (e.g., material composition, grade, etc.). The goal volume may be associated with an amount of material and/or a load on machine 10 caused by an amount of material. The goal volume and/or goal loading of machine 10 may result in a greatest amount of material being moved relative to an amount of time required to move the material, an amount of fuel required to move the material, an amount of wear on machine 12, or another associated parameter.

After the goal volume for of all cuts 36 is determined, controller 30 may design each cut 36 (Step 310). As described above, controller 30 may determine start and end locations 52, 54, the depths, and the profiles of each cut 36. The design of each cut 36 may be based on the goal volume and the overall excavation plan (e.g., based on the geometry of the associated slot 40, the number of passes, etc.). After design of all cuts within slot 40 for a particular pass of the excavation plan have been designed, controller 30 may command slot dozing of the pass containing the newly designed cuts 36 (Step 320). The command may be carried out autonomously, semi-autonomously, or manually, as desired.

During completion of a first cut 36 in the commanded pass of the excavation plan, controller 30 may determine a volume of material left behind by machine 12 that was originally intended to be moved by machine 12 (Step 330). In other words, controller 30 may determine a difference between the volume of material moved during the first cut 36 and the goal volume ("the missed volume"). Controller 30 may then compare the missed volume with one or more threshold volumes (Step 340). In the disclosed embodiment, controller 30 compares the missed volume with a maximum threshold (Threshold$_{MAX}$) and a minimum threshold (Threshold$_{MIN}$). The maximum threshold may be about equal to 3-7% of the goal volume, while the minimum threshold may be about equal to 0%.

When the missed volume is greater than the maximum threshold, controller 30 may determine that machine 12 could be attempting to move too much material, and controller 30 may decrease the goal volume for the remaining cuts 36 in the pass (Step 350). Attempting to move too much material could result in an inefficient use of time, an inefficient use of fuel, excessive wear on machine 12, and/or an undesired site profile. Controller 30 may decrease the goal volume by a set amount or, alternatively, by an amount related to a magnitude of the missed volume, as desired. Following step 350, control may return to step 300 with the newly decreased goal volume value.

When the missed volume is equal to or less than the minimum threshold, controller 30 may determine that machine 12 could be attempting to move too little material, and controller 30 may increase the goal volume for the remaining cuts 36 in the pass (Step 360). Like attempting to move too much material, attempting to move too little material could also result in an inefficient use of time, an inefficient use of fuel, excessive wear on machine 12, and/or an undesired site profile. Controller 30 may increase the goal volume by a set amount or, alternatively, by an amount related to a magnitude of the missed volume, as desired. Following step 360, control may return to step 300 with the newly increased goal volume value.

When the missed volume falls between the minimum and maximum thresholds, controller 30 may determine that the amount of material being moved by machine 12 (i.e., that the goal volume) is about right. Accordingly, control may return directly from step 340 to step 300 without any change to the goal volume value for the remaining cuts 36.

Because controller 30 may continuously examine and update (if necessary) the goal volume for each cut 36 based on performance of machine 12 during a previous cut 36, it may be more likely that the resulting contour of worksite 10 closely matches the desired contour. In addition, the efficiency, productivity, and longevity of machine 12 may be increased, by targeting an appropriate volume to moved that fully utilizes the capacity of the machine without overburdening the machine.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for a mobile excavation machine operating at a worksite, the control system comprising:
   a locating device mounted on the mobile excavation machine and configured to generate a signal indicative of a current position of the mobile excavation machine at the worksite during completion of an excavation plan; and
   a controller in communication with the locating device and the mobile excavation machine, the controller being configured to:
      autonomously control the mobile excavation machine based on the excavation plan;
      determine a volume of material missed during completion of a first cut of the excavation plan based on the signal;
      compare the volume of material missed during completion of the first cut of the excavation plan to a threshold volume of missed material; and
      adjust a characteristic of a second cut of the excavation plan based on the volume of material missed during completion of the first cut of the excavation plan.

2. The control system of claim 1, wherein the controller is further configured to:
   adjust the characteristic of the second cut of the excavation plan when the volume of material missed during completion of the first cut of the excavation plan is greater than the threshold volume of missed material.

3. The control system of claim 2, wherein the controller is further configured to compare the volume of material missed during completion of the first cut of the excavation plan to the threshold volume of missed material wherein the threshold volume of missed material falls within a range from approximately 3-7% of a goal volume of material to be removed during completion of the first cut of the excavation plan.

4. The control system of claim 2, wherein the controller is further configured to decrease a goal volume of material to be removed during completion of the second cut of the excavation plan when the volume of material missed during completion of the first cut of the excavation plan is greater than the threshold volume of missed material.

5. The control system of claim 4, wherein:
   the threshold volume of missed material is a maximum threshold volume; and the controller is further configured to increase the goal volume of material to be removed during completion of the second cut of the excavation plan when the volume of material missed during completion of the first cut of the excavation plan is approximately equal to or less than a minimum threshold volume.

6. The control system of claim 5, wherein the controller is further configured to increase the goal volume of material to be removed during completion of the second cut of the excavation plan when the volume of material missed during completion of the first cut of the excavation plan is approximately equal to or less than 0% of the goal volume of material to be removed during completion of the first cut of the excavation plan.

7. The control system of claim 1, wherein the controller is further configured to adjust a goal volume of material to be removed during completion of the second cut of the excavation plan based on the volume of material missed during completion of the first cut of the excavation plan.

8. The control system of claim 1, wherein the controller is configured to determine the volume of material missed during completion of the first cut of the excavation plan based on the signal and a known characteristic of a tool connected to the mobile excavation machine.

9. The control system of claim 8, wherein the controller is configured to determine the volume of material missed during completion of the first cut of the excavation plan based on the signal and a width of the tool.

10. The control system of claim 1, wherein the controller is further configured to generate the excavation plan based on a characteristic of an intended work area at the worksite, a characteristic of the mobile excavation machine, and a desired change in the intended work area.

11. The control system of claim 1, wherein the controller is further configured to autonomously control the mobile excavation machine based on a location, depth, and profile of a plurality of cuts within a common slot.

12. The control system of claim 11, wherein the controller is further configured to autonomously control the mobile excavation machine based on the location, depth, and profile of the plurality of cuts grouped into a plurality of passes.

13. A method of excavation planning and control, comprising:
operating a controller in communication with a mobile excavation machine to:
autonomously control the mobile excavation machine to complete an excavation plan;
determine a volume of material missed during completion of a first cut of the excavation plan;
compare the volume of material missed during completion of the first cut of the excavation plan to a threshold volume of missed material; and
adjust a characteristic of a second cut of the excavation plan based on the volume of material missed during completion of the first cut of the excavation plan.

14. The method of claim 13, wherein adjusting the characteristic of the second cut of the excavation plan includes adjusting the characteristic of the second cut of the excavation plan when the volume of material missed during completion of the first cut of the excavation plan is greater than the threshold volume of missed material.

15. The method of claim 14, wherein the threshold volume of missed material falls with a range from approximately 3-7% of a goal volume of material to be removed during completion of the first cut of the excavation plan.

16. The method of claim 14, wherein adjusting the characteristic includes decreasing a goal volume of material to be removed during completion of the second cut of the excavation plan when the volume of material missed during completion of the first cut of the excavation plan is greater than the threshold volume of missed material.

17. The method of claim 16, wherein:
the threshold volume of missed material is a maximum threshold volume; and
the method further includes increasing the goal volume of material to be removed during completion of the second cut of the excavation plan when the volume of material missed during completion of the first cut of the excavation plan is approximately equal to or less than a minimum threshold volume.

18. The method of claim 17, wherein the minimum threshold volume is approximately equal to 0% of a goal volume of material to be removed during completion of the first cut of the excavation plan.

19. The method of claim 13, wherein determining the volume of material missed during completion of the first cut of the excavation plan includes determining the volume of material based on a position of the mobile excavation machine tracked during completion of the first cut of the excavation plan and based on a known characteristic of a cutting tool connected to the mobile excavation machine.

20. A mobile excavation machine, comprising:
a traction device configured to steer and propel the mobile excavation machine;
a power source configured to power the traction device;
a locating device mounted on the mobile excavation machine and configured to generate a first signal indicative of a current position of the mobile excavation machine at a worksite during completion of an excavation plan;
a tool configured to make a cut into a surface at the worksite during completion of the excavation plan; and
a controller configured to:
generate the excavation plan based on a characteristic of an intended work area at the worksite, a characteristic of the mobile excavation machine, and a desired change in the intended work area, the excavation plan including a location, depth, and profile of a plurality of cuts arranged into a plurality of passes within a common slot;
autonomously control the power source, traction device, and tool based on the excavation plan;
determine a volume of material missed during completion of a first cut of the excavation plan based on the first signal, a known characteristic of the tool, and a goal volume of material to be removed during the first cut of the excavation plan;
decrease a goal volume of material to be removed during completion of a second cut of the excavation plan when the volume of material missed during completion of the first cut of the excavation plan is greater than a maximum threshold that falls within a range from approximately 3-7% of the goal volume of material to be removed during the first cut of the excavation plan; and
increase the goal volume of material to be removed during completion of the second cut of the excavation plan when the volume of material missed during completion of the first cut of the excavation plan is approximately equal to or less than a minimum threshold of 0% of the goal volume of material to be removed during completion of the first cut of the excavation plan.

* * * * *